INVENTORS
DAVID B. BOIES
ANDREW DRAVNIEKS

ATTORNEYS

United States Patent Office 3,416,965
Patented Dec. 17, 1968

3,416,965
FUEL CELL INCLUDING CHLORITE CONTAINING ELECTROLYTE AND METHOD OF OPERATION
David B. Boies, Chicago, and Andrew Dravnieks, Park Forest, Ill., assignors, by mesne assignments, to K. W. Battery Company, and to Joslyn Manufacturing & Supply Company, both of Chicago, Ill., both corporations of Illinois
Filed Aug. 9, 1963, Ser. No. 301,004
8 Claims. (Cl. 136—86)

This invention relates to an oxidant electrode wherein the oxidant is a soluble chlorite and to alcohol fuel cells containing the same. More particularly, this invention relates to a half cell containing a silver electrode in a sodium chlorite electrolyte which is particularly useful in a methanol fuel cell for the generation of electricity by oxidation of methanol.

In fuel cells based on hydrogen, hydrocarbons, alcohols or other hydrogen-containing compounds such as ammonia or hydrazine, there is need for an oxidant at the cathode. A common oxidant is oxygen from the air. Thus far, however, high current density, low polarization electrodes for operation on air are not available. With pure oxygen performance is more satisfactory. Oxygen is the lightest oxidant with an equivalent weight of 8 but since pressure resistant containers are needed for storage the practical equivalent weight of oxygen is much higher. For this reason, the construction of fuel cells, as well as galvanic cells, requires an active electrochemical oxidant with a low equivalent weight.

Among the characteristics desired in fuels and oxidants for fuel cells are easy storability and high energy content per unit of weight. The weight must include that of the containers for fuels. Therefore some of the fuel-oxidant systems with the highest energies (e.g., hydrogen and oxygen) lose much of their advantage due to the weight of the gas containers. On the other hand, some of the most easily stored fuels are alcohols, such as methanol. Alcohols are soluble in the aqueous electrolyte which simplifies the design of electrodes for electrochemical oxidation of alcohols in alkaline solution. Oxidants supplied in dissolved form to the fuel cell cathode require only a thin porous layer of catalytic metal on the cathode and no bulky porous electrode beyond the layer. In electrodes of the type disclosed in the Dravnieks et al. application Ser. No. 164,252, now abandoned, no multiple porosity is required for methanol oxidation and the active layer may be only 0.01–0.02 cm. thick. Accordingly compact alcohol-soluble oxidant fuel cells are feasible if an electrochemically active alkaline oxidant electrode system is available for alcohol oxidation.

It is an object of this invention to provide improved half cells or electrode-electrolyte combinations. It is another object to provide chlorite half cells useful in fuel cells. A further object is that of providing fuel cells of improved energy:weight ratios and useful current densities. It is yet another object to provide alcohol-chlorite fuel cells which are useful as power sources. It is a further object to provide electrolytes containing chlorite ions as cathodic oxidants for galvanic and fuel cells. These and other objects are apparent from and are achieved in accordance with the following disclosure and the attached drawings, wherein:

Figure 1:
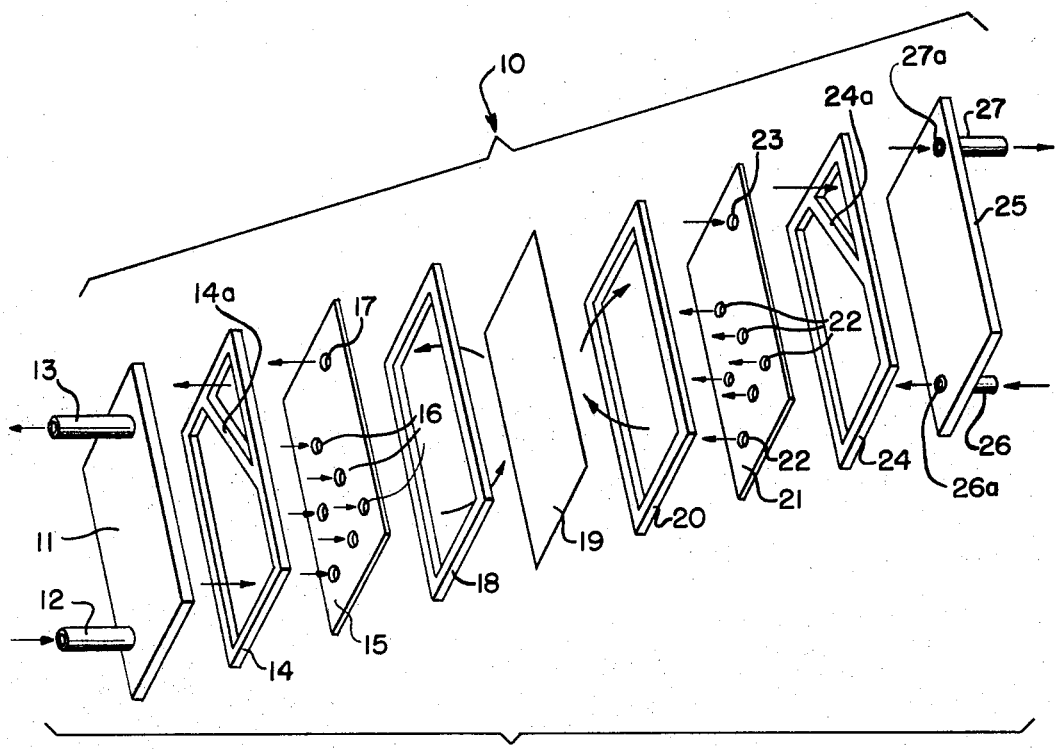
FIGURE 1 is an exploded view of a fuel cell in accordance with this invention.

FIGURE 1 represents a fuel cell 10, composed of suitable end plates 11 and 25, preferably of plastic material such as a clear acrylic resin, insulating gaskets 14 and 24, preferably of silicone rubber, electrodes 15 and 21, insulating gaskets 18 and 20, and a porous dialysis membrane 19, preferably of porous vinyl resin such as Nalco D–30 of Nalco Chemical Co. of Chicago, Ill. The members 11, 14, 15, 18, 19, 20, 21, 24 and 26 are aligned with each other to form a cell and clamped or otherwise held in position with a suitable frame (not shown). Conductors (not shown) are connected to the electrodes 15 and 21 to provide means for withdrawing electric energy from the cell.

The end plates 11 and 25 are bored and fitted with inlet tubes 12 and 26, respectively, and outlet tubes 13 and 27, respectively, thus providing means for flowing electrolyte into and out of the respective half cells containing the cathode 15 and anode 21. The spaces within the gaskets 14 and 18 form electrolyte-containing spaces on both sides of the cathode 15, and the spaces within the gaskets 20 and 24 form similar electrolyte-containing spaces on both sides of the anode 21. The porous membrane 19 allows electric current to pass through it ionically, while preventing the passage of electrolyte, thus preventing the mixture of sodium chlorite with methanol.

An alkaline sodium chlorite electrolyte is flowed into the cell 10 via the inlet tube 12 and through the end plate 11 by way of a hole (not shown) into the space within the gasket 14, then through small ($\frac{3}{32}$ to $\frac{1}{16}$ inch) holes 16 in the cathode 15 into the space within the gasket 18. Because the porous membrane 19 is impervious to aqueous solutions, the alkaline sodium chlorite solution is forced back through a hole 17 in the cathode 15 into the space within the gasket 14 separated from the other space by the partition 14a and then out of the cell by way of the outlet tube 13 connected to a hole (not shown) in the end plate 11.

The anode portion of the cell 10 is constructed in similar fashion and the methanol solution flows into the cell through the inlet tube 26 fitted to a hole 26a in the end plate 25, into the space within the gasket 24, through holes 22 in the anode 21, into the space within the gasket 20, out through a hole 23 in the anode 21, into the space within the gasket 24 separated by the divider 24a from the rest of the space, and out through the outlet hole 27a and tube 27.

The cathode 15 is a sheet of 16-gauge nickel approximately 1 inch square on which has been sprayed a thin (1–3 mils) layer of Raney silver-nickel (6:4 by weight) from which the aluminum has been leached with alkali by the procedure of the Dravnieks et al. application Ser. No. 164,252. The anode 21 is a sheet of 16-gauge nickel of the same size spray coated with Raney nickel and leached by the same procedure. The distance between the electrodes 15 and 21 is approximately ¼ inch and the distance between the end plates 11 and 25 is approximately ½ inch. Instead of nickel sheets as substances for the electrodes 15 and 21, other alkali-resistant metallic sheets such as titanium, nickel-plated steel, silver or noble metal can be used.

In the selection of an oxidant for a galvanic cell or a fuel cell several characteristics are required. Soluble oxidants should have (1) high electrode potential to provide for high cell potential when coupled with an appropriate fuel (e.g., methanol) electrode, (2) low weight per ampere hour, (3) storability in concentrated form, (4) freedom from obnoxious fumes, (5) solubility of reduction products, (6) no gas formation in reduction, (7) electrochemical activity and (8) low polarization. Although the theoretical electrode potentials for a given oxidant may be high, active low polarization electrodes for the corresponding reaction may not exist. Thus, it is necessary to select not only the proper oxidant but the proper low polarization electrode for the production of a suitable half cell which may be embodied in a galvanic cell or fuel cell.

In accordance with this invention it has been discovered that a water-soluble chlorite, for instance sodium chlorite, $NaClO_2$, is a useful oxidant to provide the cathodic reaction in fuel and galvanic cells. The reaction occurs according to the equation $$2H_2O + ClO_2^- + 4e^- \rightarrow Cl^- + 4OH^-$$

The equivalent weight of the reactants is 32 which is much less than other common oxidants such as manganese dioxide, silver oxide, lead oxide, cuprous oxide or gaseous oxygen (in cylinders or other pressure resistant containers). In alkaline hydrogen, methanol or hydrocarbon fuel cells water is generated at the anode and need not be supplied. Therefore, the equivalent weight of the sodium chlorite oxidant is 23.

The chlorite oxidant has been found to operate at high current densities at the surfaces of electrodes of silver or silver alloys, even in highly alkaline solutions. Electrodes which have proved useful in conjunction with alkaline chlorite electrolytes include porous silver, flame-sprayed layers of Raney silver-nickel alloy, platinized Raney nickel, prepared in accordance with the pending Dravnieks et al. application Ser. No. 164,252, by spraying a surface layer of aluminum-silver-nickel or aluminum-nickel alloy onto a metallic substrate (e.g., metal plates or sintered powder plates) and electrolytically leaching the aluminum-rich phase in an alkaline solution, leaving a highly developed structure consisting of an alloy composed primarily of silver and nickel. Suitable porous silver-nickel electrodes containing a high percentage of silver can be produced without loss of continuity of the nickel-rich phase. The alkaline chlorite electrolyte is also active at the surface of platinum group metals but at a slower rate.

In the selection of suitable oxidants with various electrodes for use in galvanic or fuel cells, polarization characteristics can be measured potentiostatically, observing current densities that could be obtained at electronically controlled, pre-selected polarized potentials for a variety of electrodes. Open circuit potentials and polarization characteristics of electrodes can be measured in alkaline chlorite solutions. The effect of chlorite concentration was studied for porous silver and porous silver-nickel electrodes at 25° C. The current densities for varying potentials of the chlorite electrode were observed in the range from −0.20 to +0.30 volt. The following results were observed at 23° C. in an electrolyte containing 3.0% $NaClO_2$ in 5 N KOH with a porous silver electrode:

TABLE I

*Sodium chlorite oxidant (3.0%)*

Open circuit potential— 0.28 volt—current
potential (volts) density (ma./sq. cm.)

| potential (volts) | density (ma./sq. cm.) |
|---|---|
| 0.20 | 30 |
| 0.10 | 53 |
| 0 | 83 |
| −0.10 | 108 |
| −0.20 | 137 |

Fuel cells embodying the chlorite reaction at the cathode and the oxidation of an alcohol such as methanol at the anode have been tested and found to give good current densities and potentials. Cells operated at 40–120 milliamperes per square centimeter at 50° C. and at a polarized potential of 0.6 volt. Energy yields in excess of 120 watthours per pound (260 watthour/kilogram) of chemicals are possible in continuously fed cells based on sodium chlorite solutions and methanol.

With a silver-nickel electrode, prepared by flame-spraying an alloy of aluminum-silver-nickel on a supporting surface and leaching the aluminum in alkaline media, it is possible to produce current densities of 50 amperes per square foot of electrode in a chlorite electrolyte at a potential of 0.5 volt with respect to a methanol electrode at 25° C.

The chlorite-silver electrode system has given current densities in half cell tests of several hundred amperes per square foot at 55° C. at a potential of 0.7 volt with respect to methanol. While the presence of reasonable amounts of methanol does not harm the operation of the chlorite electrode, chlorite reacts directly with methanol at the methanol electrode. Therefore, it is advantageous to limit the access of chlorite to the methanol electrode, as this would result in loss of chlorite and methanol without the recovery of useful electrical power. The access can be limited by a membrane diffusion barrier between the electrodes, and by operation of the chlorite electrode with a large amount of hydroxyl ions present, so that the current is carried by these ions rather than by chlorite ions.

Open circuit potentials and polarization characteristics of flame-sprayed and other electrodes were measured in alkaline chlorite solutions. The most effective electrodes were flame-sprayed porous silver and flame-sprayed Raney nickel-silver. The highest values of the open-circuit potential of the chlorite electrode was +0.27 to +0.30 volt.

The data indicate that the flame-sprayed silver and Raney nickel-silver electrodes give comparable results. The Raney nickel-silver electrodes are resistant to poisoning and therefore valuable in methanol-chlorite fuel cells.

Alcohol-chlorite fuel cells exhibit a favorable weight: energy ratio advantage when compared to galvanic cells or other fuel (e.g., hydrogen) cells. For instance, an alkaline methanol-chlorite fuel cell, 0.7 volt polarized working voltage, 70% current efficiency with a four-electron methanol reaction, provides 140 watthours per lb. Only an air breathing methanol fuel cell produces more energy per lb. (because of the free oxygen of the air) but it suffers from a lower current density which renders it impractical. Thus the methanol-chlorite cell provides the greatest energy per unit of weight of the commercially feasible fuel cells at useful current densities, if such other cells have to be based on gaseous fuels and oxidants stored in compressed form in heavy containers.

The invention is disclosed in further detail by means of the following examples which are provided for purposes of illustration only and are not intended to limit the invention in scope. It will be evident to those skilled in the art that various modifications in operating conditions and equivalent materials can be made without departing from the invention.

EXAMPLE 1

A fuel cell as illustrated in FIGURE 1 was operated under the following conditions:

Fuel:
 160 g. methanol/liter
 270 g. KOH/liter
Fuel electrode.—Flame-sprayed Raney nickel, platinized
Oxidant:
 370 g. $NaClO_2$/liter
 270 g. KOH/liter
Oxidant electrode.—Flame-sprayed Raney nickel-silver
Temperature.—55° C.

The fuel (anode) and oxidant (cathode) compartments were 3 millimeters thick and were separated by a dialysis membrane (D–30, Nalco Chemical Company, Chicago, Ill.). The fuel and oxidant were circulated through the cell and heated externally to maintain the temperature at 55° C.

The alkaline sodium chlorite catholyte solution was recirculated through the cathode compartment between the sprayed Raney nickel-silver cathode and the separating membrane. The alkaline methanol solution was circulated through the anode compartment on the other side of the membrane, where the anode was a platinized sprayed Raney nickel electrode.

The electrodes were sprayed on 16-gauge nickel sheets, 1 inch by 1 inch. Several small holes (1/32–1/16 inch) were drilled in the electrodes so that solutions could be fed through them. In larger cells, where several units are operated in series, the anode and cathode could be sprayed on opposite sides of the same nickel sheet, in bipolar arrangement, and the solutions could be fed through channels in the gaskets.

Figure 2:
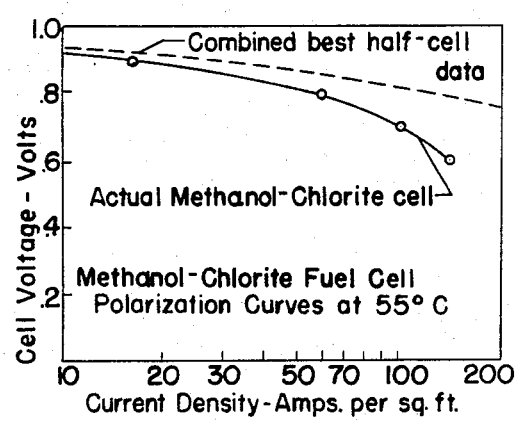
FIGURE 2 is a graph illustrating the relation between operating current density and cell voltage of a fuel cell in accordance with this invention, compared to theoretical values.

FIGURE 2 is a graph (solid line) showing the results of the fuel cell tests which are also given in Table II. For comparison, the theoretical performance based on the combined methanol and chlorite half cell data is shown by the dotted line of FIGURE 2. The performance of the fuel cell is somewhat lower than theoretical, probably due to the IR drop in the electrolyte and membrane and possible variations in electrodes. The cell output was 144 milliamperes per square centimeter at 0.6 volt.

The efficiency of utilization of methanol in this cell was studied on long term tests. It was found that the number of electrons obtained per methanol molecule approaches four at high current densities and falls off as the current density is lowered. This is caused by an approximately constant loss of methanol by chemical reaction with the chlorite due to diffusion of these materials across the membrane. At lower current densities this loss becomes an appreciable part of the total methanol consumption and thus results in a lower current efficiency with both chlorite and methanol.

and located close to the electrode surface 32a in order to reduce voltage drop through the electrolyte 31. The electrolyte 31 is connected by means of a bridge 39 in the form of a glass tube containing 10% $NaClO_2$ in 5 N KOH solution to a platinum half cell 40 contining 10% $NaClO_2$ in 5 N KOH solution 41 and a platinum electrode 42 immersed therein.

The negative terminal 44 of a power supply 45 is connected by a wire 46 to the platinum electrode 42. The positive terminal 47 of the power supply is connected by a wire 48 to an ammeter 49 and the latter is connected by a wire 50 to the electrode 32. The calomel electrode 37 is connected by a wire 52 to vacuum tube voltmeter 53 and the latter is connected to the electrode 32 by a wire 54.

The half cell is operated under a nitrogen atmosphere supplied via a tube 55 and the electrolyte was stirred by means of a stirrer 56 actuated by a motor (not shown). The potential was measured by the saturated calomel half cell 36 through the capillary caustic-impregnated bridge 35 placed just above the electrode surface. Polarizing current was supplied through the solution-bridge 39 to the test container 30. For constant current tests a Kepco Model SM 160 4M power supply 44 was used.

Polarization characteristics were measured potentiostatically, observing current densities that could be obtained at electrically controlled preselected polarized potentials. The results at 23° C. with the electrolyte of 10% $NaClO_2$ in 5 N KOH are shown in Table III. It is seen that sodium chlorite was able to supply practically worthwhile current densities at acceptable polarizations.

Figure 3:
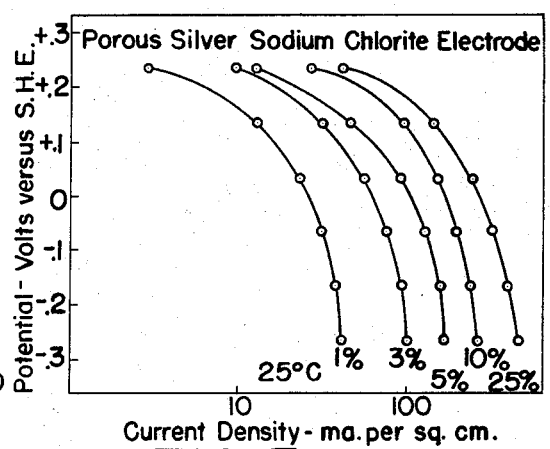
FIGURE 3 is a series of graphs illustrating the relation between current density and cell potential of a cell in accordance with this invention at various concentrations of electrolyte.

FIGURE 3 illustrates the increase in the useful current density that is obtained by an increase in the concentration of chlorite.

TABLE III

| Open circuit potential, Voltage | Electrodes—Current density, ma./sq. cm. | | | | |
|---|---|---|---|---|---|
| | Sprayed Raney Ag-Ni | Sprayed Ag | Platinized Sprayed Raney Ni | Platinized Pt | Carbon |
| | 0.26 v. | 0.27 v. | 0.30 v. | 0.30 v. | 0.10 v. |
| 0.20 | 35 | 48 | 1.1 | 3 | |
| 0.10 | 92 | 118 | 6 | 13 | |
| 0 | 170 | 172 | 25 | 50 | |
| −0.10 | 280 | 215 | 90 | 104 | 0.03 |
| −0.20 | | 245 | | 200 | 0.03 |

TABLE II.—METHANOL–SODIUM CHLORITE CELL AT 55–60° C.

| Potential (millivolts) | Current (ma. per cell) | Current Density (ma./sq. cm.) |
|---|---|---|
| 980 | 0 | 0 |
| 900 | 100 | 16 |
| 800 | 380 | 59 |
| 700 | 660 | 102 |
| 600 | 930 | 144 |

EXAMPLE 2

Figure 4:
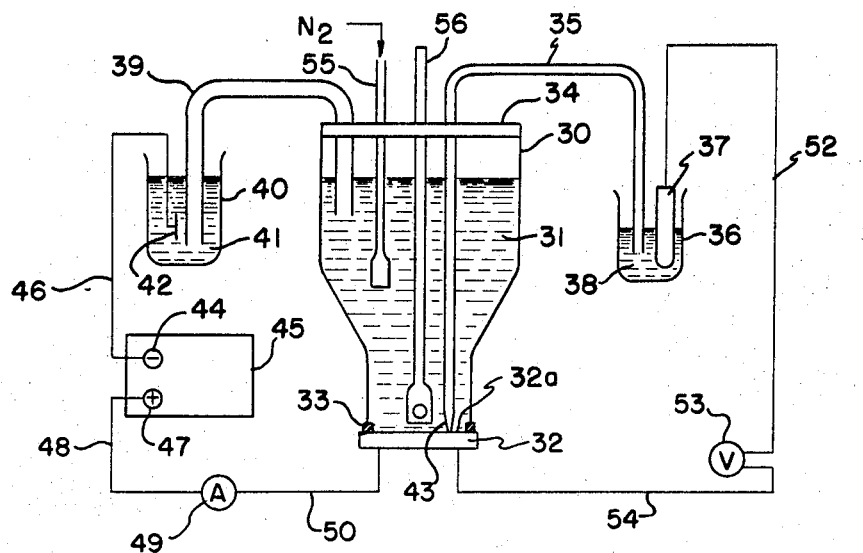
FIGURE 4 is a diagram of a half cell test unit.

The sodium chlorite aqueous oxidant system was tested with a porous silver electrode by conventional half cell polarization techniques in the half cell unit shown in FIGURE 4, wherein 30 is a glass vessel containing an electrolyte 31 of 10% $NaClO_2$ in 5 N KOH solution. The porous silver electrode 32 was joined to the vessel 30 by a clamp (not shown) and the joint was maintained watertight by a gasket 33. To the top of the vessel 30 was affixed a cover 34 with suitable holes for inlet tubes and a stirrer. A bridge in the form of a capillary glass tube 35 containing an asbestos wick (not shown) saturated with 10% $NaClO_2$ in 5 N KOH solution connects the electrode surface 32a with a saturated calomel half cell 36 which contains a calomel electrode 37 in saturated KCl solution 38. The bridge 35 is drawn to a capillary 43

We claim:
1. A fuel cell having a fuel electrode system containing an alcohol as a fuel and an oxidant electrode system having an alkaline sodium chlorite solution and a porous silver electrode.

2. A fuel cell having a fuel electrode system containing an alcohol as a fuel and an oxidant electrode system having an alkaline sodium chlorite solution and a porous Raney nickel-silver electrode.

3. A fuel cell comprising a fuel electrode system having an organic fluid fuel whose moecule includes an oxygen atom bonded to a carbon atom, and an oxidant electrode system having a porous electrode containing a substantial quantity of silver, a carrier therefor, and an electrolyte in which said electrode is immersed, the electrolyte entering the pores of the electrode, said electrolyte containing chlorite ions in contact with at least the pore surfaces the electrode.

4. A fuel cell as defined in claim 3, wherein said electrode consists essentially of silver.

5. A fuel cell as defined in claim 3, wherein said electrode is a Raney silver-nickel alloy.

6. A fuel cell comprising in combination an anode, a porous cathode spaced apart from said anode, a permeable membrane positioned between said anode and said cathode, an anolyte compartment adapted to retain liquid extending between and communicating with said anode and one side of said membrane, a catholyte compartment adapted to retain liquid extending between and communicating with said cathode and the other side of said membrane, an alkaline anolyte containing an alcohol as a fuel in said anolyte compartment, and an alkaline chlorite catholyte in said catholyte compartment, said cathode containing a substantial quantity of silver.

7. A fuel cell as defined by claim 6 wherein the catholyte is an alkaline solution of sodium chlorite, said cathode is a silver electrode, the anolyte is an alkaline solution of methanol, and the anode is a platinized Raney nickel electrode.

8. A method of operating a fuel cell comprising in combination an anode, a porous cathode spaced apart from said anode containing a substantial quantity of silver, an anolyte compartment adapted to retain liquid extending between and communicating with said anode and one side of a porous dialysis membrane, a catholyte compartment adpated to retain liquid extending between and communicating with said cathode and the other side of said membrane, an aqueous alkaline soluble chlorite catholyte in ionic communication with said cathode and one side of said membrane, an aqueous alkaline anolyte in ionic communication with said catholyte and the other side of said membrane, said catholyte and said anolyte providing means for ionic conductance between said anode and said cathode, which comprises passing an organic fluid fuel whose molecule has an oxygen atom bonded to a carbon atom into dual contact with said anode and said anolyte, passing said soluble chlorite into dual contact with said cathode and said catholyte, and establishing electrical connection between said anode and said cathode external to said cell.

References Cited

UNITED STATES PATENTS

| | | | |
|---|---|---|---|
| 567,721 | 9/1896 | Payson | 136—86 |
| 2,612,532 | 9/1952 | Heise et al. | 136—86 |
| 3,012,086 | 12/1961 | Vahldieck | 136—86 |
| 3,062,909 | 11/1962 | Reutschi | 136—86 |
| 3,110,622 | 11/1963 | Hipp | 136—86 X |
| 3,150,011 | 9/1964 | Winsel et al. | 136—86 X |
| 3,206,332 | 9/1965 | Juda | 136—86 |
| 3,261,716 | 7/1966 | Roblee et al. | 136—86 |

FOREIGN PATENTS 23,101  1892  Great Britain.

OTHER REFERENCES

Lange's Handbook of Chemistry; 9th Edition, 1956 p. 1216.

ALLEN B. CURTIS, *Primary Examiner.*

U.S. Cl. X.R.

136—154